March 8, 1966  M. C. YEASTING  3,238,798
CONTROLS FOR VIBRATORY APPARATUS
Filed Sept. 25, 1961  3 Sheets-Sheet 1

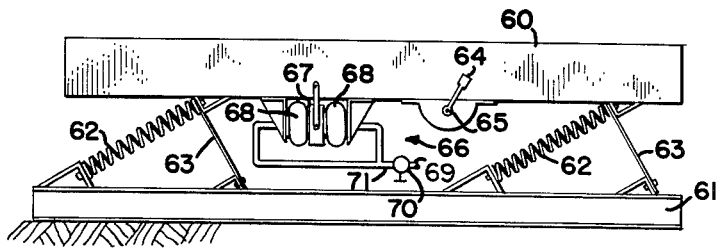
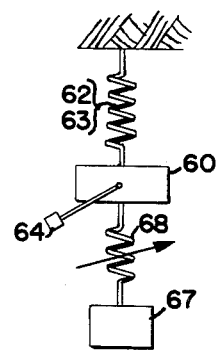
Fig. 5
Fig. 6
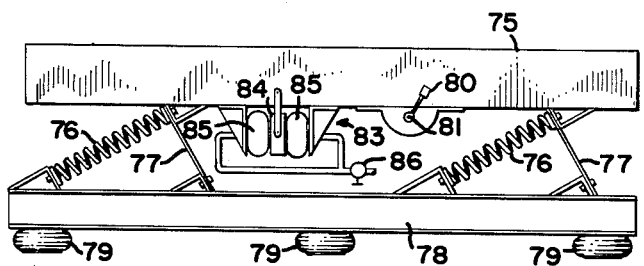
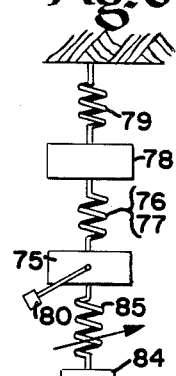
Fig. 7
Fig. 8
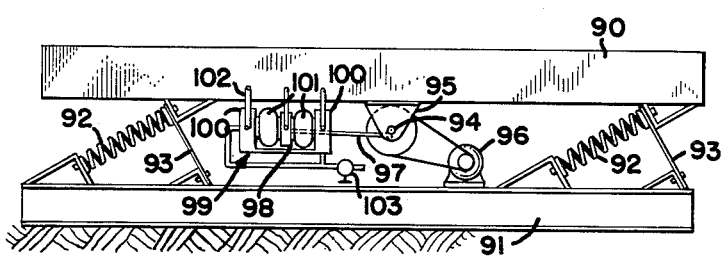
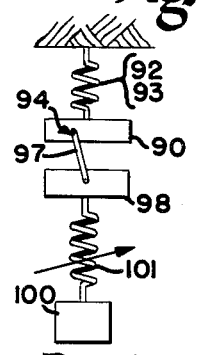
Fig. 9
Fig. 10

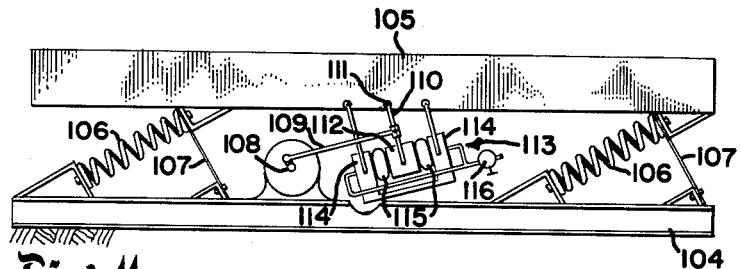
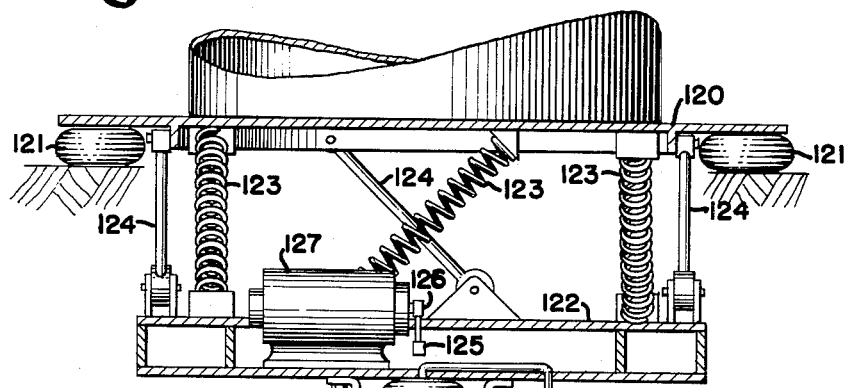
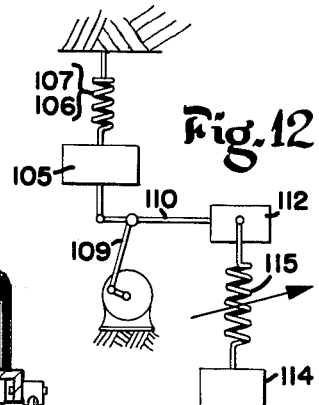
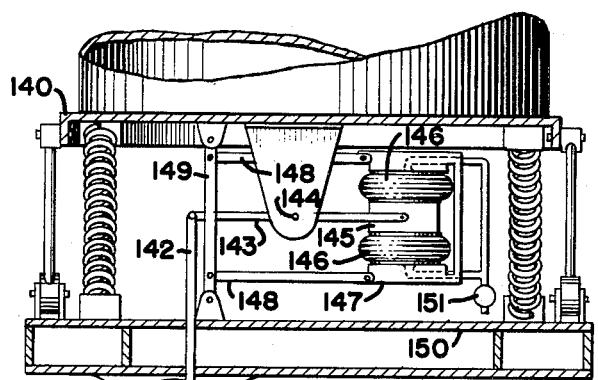

United States Patent Office

3,238,798
Patented Mar. 8, 1966

3,238,798
CONTROLS FOR VIBRATORY APPARATUS
Maynard C. Yeasting, Elmore, Ohio, assignor to Rex Chainbelt Inc., a corporation of Wisconsin
Filed Sept. 25, 1961, Ser. No. 140,582
10 Claims. (Cl. 74—87)

This invention relates to vibratory apparatus and in particular to means for controlling the amplitude of vibration of a vibratory work member.

Vibratory feeders and conveyors are commonly employed to convey material that cannot be readily handled on other types of conveyors because of its heat content, abrasive qualities, etc. In many installations it is desirable to be able to control the rate of feed or the rate of conveying and to be able to vary such rates at will. When electromagnetic drives are employed with tuned vibratory systems, the amplitude of vibration may be readily controlled by variation of the electrical power supplied to the driving electromagnet. This is conveniently done by use of an adjustable autotransformer or resistances connected in series with the coil of the electromagnetic vibrator to reduce the power input to the vibrator. The electromagnetically driven vibrators are of limited usefulness because they are limited in size and to vibration at the frequency of the electrical power which is ordinarily 3600 cycles per minute. Much more satisfactory vibratory conveying action for most materials may be obtained by operating the conveyor at frequencies in the order of 500 to 900 cycles per minute. Vibratory conveyors and feeders operating in this frequency range are ordinarily vibrated by rotating eccentric weights or by crankshafts and connecting rods. The control of the amplitude of vibration of these feeders or conveyors has ordinarily been accomplished by mechanical adjustment of the mass or radius of gyration of the eccentric weights, variation of the eccentricity of a crankshaft, or by inserting an adjustable lever between a connecting rod of a crankshaft driven apparatus and the work member and varying the ratio of the arms of the lever to thus control the length of the stroke. These methods of control are both awkward and expensive.

Another method of control that has been used to a limited extent is to tune the vibratory conveyor or feeder on its mounting so that it has a pronounced resonant frequency and then varying the speed of rotation of eccentric weights journaled on the vibrating member. The amplitude of vibration increases as the operating frequency approaches the resonant frequency of the apparatus. This system requires an adjustable speed drive motor or adjustable pitch pulleys in the drive mechanism between the pulley and the eccentric weight shaft, both of which are expensive methods of control.

Another method of control, as illustrated in U.S. Patent No. 2,984,339, employs a constant speed eccentric weight drive, and adjustable rate springs employed in a resonant system to change the tuning of the system and thus the response of the system to the vibratory force of the weights. In this arrangement one or more variably inflated air springs are employed as resilient elements and the spring rate of the air springs is varied by variation of the inflation pressure to vary the tuning of the system and thus its response to the vibratory force.

The principal object of this invention is to provide a vibratory control system in which the transmission of force from the vibration generator to the work member is controlled by variation of the tuning of a dynamic vibration absorber connected to the drive mechanism or force transmission mechanism.

Another object of the invention is to provide a constant force, constant frequency vibration exciter with a variable tuned dynamic vibration absorber arranged to cancel the unwanted force of the constant force generator.

A still further object of the invention is to employ the force of a variably tuned dynamic vibration absorber as a reaction force for a vibration generator and thus control the amplitude of vibration of a member driven by such generator.

A still further object of the invention is to provide a controlled vibratory system in which the amplitude control mechanism is lightly stressed when the system is operating at full load.

More specific objects and advantages are apparent from the following description of preferred forms of the invention.

According to the invention a vibratory work member is driven by a vibration generator and force transmission system that includes a tunable dynamic vibration absorber arranged to control the amplitude of the force actually applied to the vibratory work member. In one form of the invention the dynamic vibration absorber is arranged to oppose the vibratory force of eccentric weights so that the difference between the eccentric weight force and the dynamic absorber force is the force actually applied to the vibratory work member. In another form of the invention the tunable dynamic vibration absorber provides an adjustable reaction force for a constant stroke vibration exciter and thus regulates the force actually applied to the work member. In still another form of the invention a differential force transmission mechanism is employed and a tunable dynamic vibration absorber is connected to a portion of the differential mechanism to control the amplitude of the force applied to the work member. In each form of the invention the dynamic vibration absorber, by the tuning of its resilient element, varies the force applied to the vibratory work member and therefore its amplitude of vibration.

Preferred embodiments of the invention are illustrated in the accompanying drawings.

In the drawings:

FIG. 5 is a generally diagrammatic side elevation of a vibratory feeder or conveyor showing another arrangement according to the invention.

FIG. 6 is a functional diagram illustrating the cooperation of the essential elements of the equipment shown in FIG. 5.

FIG. 7 is a side elevation of a feeder or conveyor similar to that shown in FIG. 5 except that it is mounted on a vibrationally isolated base.

FIG. 8 is a functional diagram illustrating the cooperation of the essential elements of the equipment shown in FIG. 7.

FIG. 9 is a side elevation of a simplified conveyor or feeder showing still another form of the invention.

FIG. 10 is a functional diagram of the essential parts of the equipment shown in FIG. 9.

FIG. 11 is a side elevation showing still another embodiment of the invention.

FIG. 12 is a functional diagram illustrating the cooperation of the essential elements of the equipment shown in FIG. 11.

FIG. 13 is a simplified vertical section of a controllable vibratory drive for producing helical motion of a drive table or helical conveyor.

FIG. 14 is a fragmentary vertical section of an easily controlled adjustable amplitude drive for a helical conveyor or similar structure.

Figure 1:
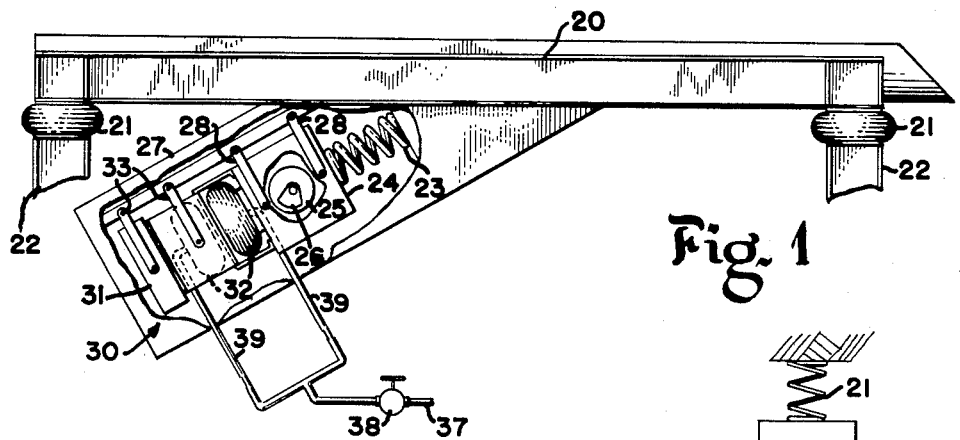
FIG. 1 is a side elevation with parts broken away showing a simple vibratory feeder equipped with a drive mechanism constructed according to the invention.

These specific figures and the accompanying description are intended merely to illustrate the invention and not to impose limitations on its scope.

In a vibratory feeder or conveyor having a drive mechanism constructed according to the invention a conveyor trough 20, constituting a work member, is resiliently supported on isolating springs 21 that rest on the tops of columns 22. The isolating springs 21 are preferably low pressure air springs that provide a very low spring rate in comparison with their load carrying ability. These springs permit the work member 20 to easily vibrate laterally as well as vertically and thus prevent the transmission of objectionable vibratory force to the columns 22. Vibratory force is applied to the conveyor trough or work member 20 through a coupling spring 23 connected to an exciter 24 which includes a motor 25 having eccentric weights 26 mounted on its armature shaft. The exciter 24 and coupling spring 23 are enclosed within a housing 27 that is attached to and extends from the work member 20 in a downwardly inclined direction generally parallel to the path of the desired vibratory motion of the work member 20. The housing 27 may just as well be positioned above the work member 20 in which case it extends upwardly to the right above the right-hand end of the work member 20.

The path of relative movement between the exciter member 24 and the work member 20, or the housing 27 rigidly attached thereto, is defined by guide links 28. The guide links 28 may be pivotally connected links, as shown, or they may be cantilever leaf springs, or rubber blocks inserted between surfaces of the exciter 24 and the housing 27 and stressed in shear by the relative movement between the exciter member 24 and the housing 27.

Figure 3:
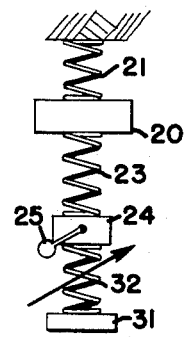
FIG. 3 is a functional diagram illustrating the cooperation of the essential elements of the structure shown in FIG. 1.

The work member 20, the spring 23 and the exciter 24 form a vibratory system as illustrated in FIG. 3 that is tuned, preferably, to a frequency slightly higher than the operating speed of the motor 25. This much of the system is equivalent to the apparatus shown in Figs VI and VII of U.S. Patent No. 2,958,228. As explained in this patent the exciter member 24 should have a mass in the order of 10 to 50 percent of the mass of the work member 20 and when operated just below its resonant frequency the work member 20 and the exciter member 24 vibrate in phase opposition with amplitudes that are generally inversely proportional to their masses. The amplitude of vibration of the exciter member 24 is slightly less than the mass ratio would indicate, the difference in acceleration forces being provided by the centrifugal force of the eccentric weights 26.

Figure 2:
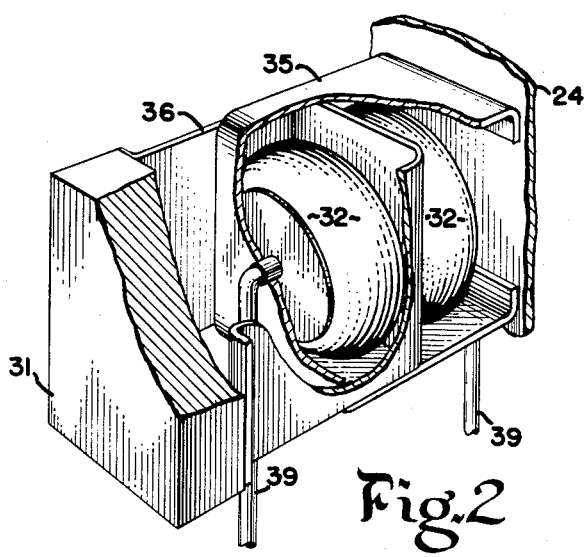
FIG. 2 is an enlarged perspective view of the dynamic vibration absorber employed in the structure shown in FIG. 1.

In order to control the amplitude of vibration of the work member 20 a dynamic vibration absorber 30, comprising a mass 31 and adjustable resilient members in the form of air springs 32, is coupled to the exciter 24. Preferably the absorber mass 31 is guided by links or cantilever springs 33 connected to the housing 27 so that it moves in a direction parallel to the path of vibration of the exciter member 24. As indicated in greater detail in FIG. 2, the resilient means or air springs 32 are stacked in the bight of a yoke 35 rigidly attached to the exciter member 24. A similar yoke 36, connected to the absorber mass 31, is linked through the first yoke 35 and passes between the air springs 32 contained therein. In this arrangement the air springs statically oppose each other while they aid each other in opposing displacement of the absorber mass 31 relative to the exciter member 24.

The air springs 32 are inflated from an air supply line 37 by way of a pressure regulating valve 38 and connecting tubing 39 leading to the air springs 32. Preferably the tubing 39 is of small diameter or includes restrictions to minimize the circulation of air from one of the springs to the other in response to vibratory force.

It is a characteristic of air springs that their effective spring rate as well as their static force varies with the inflation pressure. The spring rate of an individual spring is not linear because, for a constant quantity of air in the spring, the resisting pressure varies inversely as the volume of the air spring. However, when two such air springs are used in opposition, as illustrated, so that one spring expands as the other contracts the resulting spring rate of the pair of springs is practically independent of the deflection and varies directly as the air pressure to which the springs are inflated. The air springs 32, therefore, constitute tunable resilient means the spring rate of which may be readily adjusted by variation of the inflation pressure.

The dynamic vibration absorber comprising the absorber mass 31 and the air springs 32 coupled to the exciter member 24 provides a means for cancelling part or all of the force exerted by the eccentric weights 26. If the absorber is tuned exactly to the operating speed of the motor it vibrates at an amplitude such that the force transmitted through the air springs 32 exactly balances or matches the centrifugal force of the eccentric weights 26. With this condition of tuning the amplitude of motion of the exciter 24 is practically zero and consequently the work member 20 has no vibratory motion except as may be transmitted at right angles to the vibratory path through the links 28 acting as struts. This occurs because the tuned absorber appears as an infinitely stiff spring or an infinite mass connected to the exciter member 24. As the inflation pressure is decreased the dynamic absorber appears as a finite stiff spring resisting movement of the exciter member 24. At the reduced inflation pressure the exciter member works against the combined spring force of the dynamic absorber and the coupling spring 23 and vibrates at an amplitude determined by the sum of the effective spring forces to transmit through the coupling spring 23 a corresponding vibratory force to the work member 20. The magnitude of vibration of the exciter 24 and therefore the force applied to the work member 20 thus varies according to the tuning of the dynamic absorber. As the inflation pressure approaches zero very little resisting force is transmitted through the air springs 32 and the absorber mass 31 remains stationary or nearly so while the exciter 24 and work member 20 execute their maximum amplitudes of vibration.

In this arrangement the eccentric weights 26 and the exciter 24 together with the coupling spring 23 constitute drive means for applying vibratory force to the work member 20 while the absorber mass 31 and air springs 32 constitute a tunable dynamic vibration absorber connected to the drive means to control the amplitude of vibration or the amplitude of the vibratory force transmitted to the work member.

Figure 4:
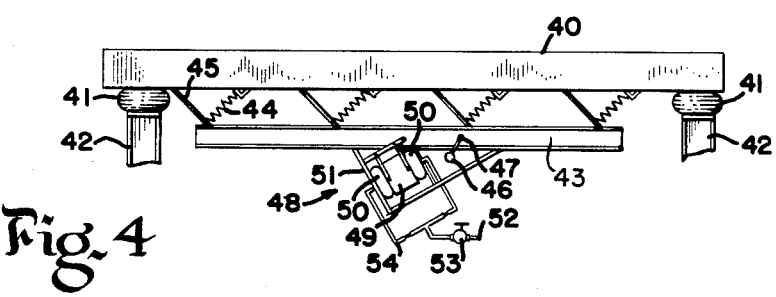
FIG. 4 is a side elevation of a vibratory conveyor constructed according to the invention.

The arrangement shown in FIG. 1 is typical of the feeder type of conveyor wherein the work member, the trough 20, is relatively short and stiff so that all of the vibratory force applied to the work member may be concentrated at one point along its length without causing serious deflections or high stresses in the structure of the work member. The ordinary vibratory conveyor, on the other hand, is usually of substantial length and the support or coupling springs are distributed at intervals along its length so that the inertia forces of the sections of the conveyor are counteracted by the coupling springs carrying such portion or such section of the conveyor. The improved drive means may be applied to a long conveyor as illustrated in FIG. 4 in which a conveyor trough 40 constituting a work member is resiliently supported on a plurality of isolating springs 41 of which two are shown and which preferably are low pressure air springs to provide a soft resilient mounting which does not transfer objectionable vibratory force to the foundation represented by pads 42. An elongated exciter member 43 extends parallel to the work member 40 throughout the major portion of its length and is coupled to the work member 40 by a plurality of coupling springs 44 distributed at intervals along the length of the exciter member 43 and work member 40. If the coupling springs 44 lack lateral stability guide links in the form of pivoted links or cantilever springs 45 may be provided at or near each of the coupling spring locations. The combination of the cantilever springs 45 and the coupling springs 44 have a spring rate such that when coupled with the corresponding sections of the work member 40 and exciter member 43 they form vibratory systems having a natural or resonant frequency slightly greater than the desired operating frequency of the system. Ordinarily such a system is tuned to be resonant at a frequency about 10 percent higher than the actual operating frequency.

Vibratory force is applied to the exciter member 43 by rotating eccentric weights 46 carried on a shaft 47 that is journaled in the exciter member 43. Means, not shown, are provided to rotate the shaft 47 and eccentric weights 46 at a substantially constant speed. These means may comprise an electric motor mounted on the exciter member 43 and forming a part thereof or a motor mounted on a separate base and belt connected to the shaft 47.

This much of the system forms a non-adjustable vibratory conveyor and may be designed to provide substantially constant amplitude of vibration for substantial changes in load being conveyed over the conveyor.

To control the amplitude of vibration and thus the rate of feed of the conveyor a dynamic vibration absorber 48 comprising an absorber mass 49 and adjustable resilient means in the form of air springs 50 is housed in a frame 51 attached to the exciter member 43. The air springs 50 are inflated to suitable pressures from an air line 52 connected through a pressure regulator 53 and connecting tubes 54 leading to the individual air springs 50.

When the inflation pressure is low or nearly zero the dynamic absorber 48 has little or no effect on the amplitude of vibration of the exciter member 43 and the work member 40. This corresponds to the maximum delivery condition for the conveyor at which the amplitudes of vibration of the work member 40 and exciter member 43 are a maximum. As the inflation pressure is increased the dynamic absorber appears as a spring resisting movement of the exciter member 43. For small and moderate inflation pressures the resulting spring force applied to the exciter member 43 in opposition to the force of the eccentric weights 46 reduces the amplitude of vibration. As the inflation pressure is increased still further and the dynamic absorber becomes tuned to the operating speed it appears as an infinitely stiff spring and motion of the exciter member 43 in the direction of vibratory motion of the absorber is reduced to zero. The absorber does not affect the motion at right angles to the vibratory path, that is, parallel to the cantilever springs 45 and in this direction the amplitude of vibration remains substantially constant and is determined by the relative force of the eccentric weights 46 and the total mass of the work member 40 plus the exciter member 43. The amplitude of vibration in this direction in this type of equipment is almost negligible, being in the order of 4 or 5 percent of the maximum stroke of the work member 40.

In this arrangement, as shown in FIG. 4, the exciter member 43, extending parallel to the work member 40, together with the eccentric weight shaft 47 and eccentric weights 46 constitutes drive means acting through the connecting springs 44 to apply vibratory force to the work member 40. The dynamic absorbed 48, tunable by variation of the inflation pressure of its air springs, constitutes a tunable dynamic absorber connected to the drive means to control the amplitude of vibration of such drive means.

In the apparatus as illustrated in FIGS. 1 and 4 the system comprising the work member and exciter member is tuned near resonance so that a relatively small force from the eccentric weights produces a much larger force applied to the work member 40. This force multiplication, obtained by resonance, makes it possible to provide the required vibratory motion with relatively small eccentric weights and this reduces the required size of the dynamic vibration absorber required to completely counterbalance the force of such eccentric weights when it is desired to stop the vibration of the work member. In practice the dynamic vibration absorber masses 31 or 49 need not be greater than approximately 5 percent of the mass of the work members 20 or 40. The actual size of the dynamic absorber mass required depends upon the allowable vibratory stroke through which the mass may vibrate when completely balancing or absorbing the force of the eccentric weight.

When the loads on the bearings carrying the eccentric weight shaft is not a problem, as in the case of small and medium sized equipment, the eccentric weight shaft may be journaled directly in the work member and the dynamic vibration absorber also connected directly to the work member. Such an arrangement is illustrated in FIGS. 5 and 6. In this embodiment, a conveyor trough or work member 60 is resiliently supported on a fixed base 61 by means of coupling springs 62 either acting alone or in cooperation with cantilever guide springs 63. In some types of small vibratory conveyors suitable cantilever guide springs 63 may provide all of the resilient force thus making the springs 62 unnecessary. For good load carrying ability this system is preferably tuned so that the combination of the work member 60 and the resilient coupling means 62 and 63 forms a vibratory system having a natural frequency near but preferably greater than the operating speed at which the system is to be vibrated.

In this arrangement vibratory force for driving the work member 60 is provided by eccentric weights 64 carried on an eccentric weight shaft 65 that is journaled in the work member 60 preferably near its center of gravity. The eccentric weight shaft 65 may be belt driven but preferably is the armature shaft of a constant speed motor that is mounted on the work member 60.

To control the amplitude of vibration of the work member 60 in response to the vibratory force of the eccentric weights 64, as they are rotated at constant speed, a tunable dynamic vibration absorber 66 is provided. This absorber comprises an absorber mass 67 that is coupled to the work member 60 through air springs 68. The air springs 68 are inflated from an air pressure line 69 through an adjustable pressure regulator 70 connected to tubing 71 leading directly to the air springs 68.

As in the preceding examples, the effective spring rate of the air springs 68 may be varied over a wide range by variation of the inflation pressure which is controlled by the regulator 70. In this figure the dynamic vibration absorber 66 is shown arranged to control the horizontal movement of the work member 60. The remaining vertical movement does not cause any conveying action.

The functional cooperation of these particular elements is illustrated in FIG. 6 where the work member 60 is shown connected to ground through the resilient means 62, 63 to provide a tuned system which, as explained before, is tuned to a natural frequency slightly higher than the operating speed of the eccentric weight 64. Without the absorber this system vibrates at substantial amplitude in response to the vibratory force. The addition of the tuned absorber, when it is tuned near resonance, supplies a force in opposition to the eccentric weights to reduce or eliminate the vibration of the work member 60. This structure, as shown in FIG. 5 and represented in FIG. 6, thus includes a work member, a drive means constituted by eccentric weights 64 and shaft 65 for applying vibratory force to the work member, and a dynamic vibration absorber, which being connected to the same mass or member as the drive means is therefore operatively connected to the drive means to control the response of the work member to the vibratory force from the drive means.

In this structure the full vibratory force of the work member 60 transmitted through the coupling springs 62, 63 is applied to the base member 61 and from it to the foundation. In many instances this results in objectionable vibration of the foundation. To reduce or minimize these forces the base of the vibratory structure may be mounted on isolating springs thus producing an arrangement such as is shown in FIGS. 7 and 8. In this embodiment a work member 75 is carried on resilient coupling means 76, 77 connected to a base 78 which in turn is mounted on cushioning means in the form of low pressure air springs 79. The air springs 79 are preferably of the large area, low pressure variety to provide a very low spring rate in comparison with their load carrying capacity. This system is driven by centrifugal force from eccentric weights 80 transmitted through a shaft 81 carrying the eccentric weights and journaled in the work member 75. This vibratory force produces out of phase vibrations of the work member 75 and base 78, the amplitudes of vibration being generally inversely proportional to the masses of the work member 75 and base 78. This combination is illustrated schematically in FIG. 8 wherein the isolating springs 79 are shown as supporting the base 78 from a foundation or other rigid means and the base 78 in turn supports, by means of resilient means 76, 77, the work member 75. The work member 75, base 78 and resilient means form the tuned vibratory system that preferably is tuned to a frequency slightly higher than the desired operating speed of the eccentric weight shaft 81. The base 78 in the arrangement of this nature is ordinarily made several times heavier than the work member 75 to minimize the stroke of the base 78 and therefore the stroke of the springs 76 and isolating springs 79.

The amplitude of vibration in this example, as in the preceding examples, is controlled by a dynamic vibration absorber 83 that comprises a mass 84 and air springs 85. As before, the inflation pressure of the air springs is controlled by a pressure regulator 86 to vary the tuning of the absorber.

In each of the preceding examples the vibratory force was provided by eccentric weights rotating at a substantially constant speed. Other types of vibration generators may also be employed. One such type is illustrated in FIGS. 9 and 10 in which a crankshaft and connecting rod driven at a substantially constant speed provides the vibratory motion. In this example a conveyor trough or work member 90 is supported on a base 91 by coupling springs 92 that may be guided by cantilever leaf springs 93. The coupling springs 92 and cantilever leaf springs 93 are proportioned so that the system comprising the work member 90 and the springs is resonant at a frequency preferably slightly higher than the operating speed of the drive. This tuning may also be such that the resonant frequency is lower than the operating speed except that under this latter condition some disadvantages may be encountered particularly in the changes in amplitude with respect to changes in load.

The driving force for the work member 90 is provided by a crankshaft 94 journaled in bearings in a bracket 95 depending from the work member 90 and belt driven by a motor 96 mounted on the base 91. The crankshaft 94 is connected through a connecting rod 97 and crosshead 98 to a dynamic vibration absorber 99 that comprises a pair of interconnected masses or weights 100 resiliently connected to the crosshead by means of the adjustable resilient means in the form of air springs 101. The crosshead 98 and the absorber weights 100 are guided from the work member 90 by links or cantilever springs 102. While these links or springs 102 are shown connected to the work member 90 they may just as well be connected to the base 91. In this arrangement the inflation pressure of the air springs 101 is controlled by a pressure regulator 103.

The tuning of the air springs 101 of the dynamic vibration absorber in this arrangement produces a different action than that described in the preceding examples. If the air springs 101 are deflated or operated at very low air pressure the force transmited from the crosshead 98 to the absorber mass members 100 is practically zero and therefore the reaction force of the crankshaft against the work member 90 varies according to the speed of operation and the mass of the crosshead 98. Since the crosshead is relatively light this results in a small force and the work member 90 vibrates at an amplitude determined by the tuning of the springs 92 and this small force. The tuning of the springs 92 should be such that the work member 90 has a resonant frequency from 10 to 20 percent higher than the operating speed so that the system comprising the work member 90 and its springs is equivalent of a spring insofar as drive forces applied to the work member are concerned.

As the inflation pressure of the air springs is increased a condition of tuning is reached wherein the crosshead 98, the air springs 101 and the absorber mass 100 form a two mass resonant system. When this occurs very little force is required in the connecting rod 97 to maintain a substantial amplitude of vibration of the crosshead and absorber mass 100 and therefore there is very little reaction force back through the crankshaft 94 to the work member 90. The work member therefore is practically quiescent under this condition. Upon further increase in inflation pressure of the air springs 101, the absorber 99 appears as a stiff spring acting against the crosshead 98 with the result that substantial driving force is transmited back through the connecting rod and crankshaft to the work member. This force increases with the inflation pressure until when the resonant frequency of the absorber mass 100 on the air springs 101 becomes equal to the operating speed the air springs 101 apply just sufficient force to the crosshead 98 to hold the crosshead stationary in space so that the work member 90 is then driven through a vibratory stroke corresponding to the throw of the crankshaft 94. It may be observed that in this condition of tuning the amplitude of vibration of the vibration absorber mass 100 varies according to the force required to vibrate the work member 90 at that particular operating speed. If the force required, because of applied load, increases the amplitude of vibration of the absorber also increases. Likewise if the load forces decrease the amplitude of vibration of the absorber also decreases.

This particular system has the interesting property that if the excess in the spring rate of the coupling springs 92 over the inertia of the work member 90 is equal to the average between the minimum and maximum spring rates of the air springs 101 with the full range of control of inflation pressure then the amplitude of vibration of the work member 90 is a substantially linear function of the inflation pressure of the air springs 101.

It may be noted in this type of equipment that the combination of the work member 90 on its support springs must not be tuned to resonance at the operating speed because the control of the amplitude of the vibration is effected by varying the reaction force against the connection rod 97. While this force may be reduced to zero by a particular condition of tuning, as explained above, it can not control the amplitude of vibration when the work member 90 is exactly resonant on its support springs 92, 93. In this case if both are exactly resonant very little force is required by either and the amplitude of vibration of the work member then becomes indeterminate and varies very rapidly with small changes in operating conditions. To avoid this instability, the work member is tuned to have a resonant frequency higher or lower than the operating speed so as to appear as a fairly stiff spring or mass which is opposed to the spring effect of the dynamic vibration absorber to control the amplitude of vibration.

While the system illustrated in FIGS. 9 and 10 provides good control of the amplitude of vibration with changes in inflation pressure of the air springs it suffers from the disadvantage that the crankshaft 94 and the pulley thereon partake of the vibration of the work member 90 whereas the drive motor 96 does not vibrate and therefore the belts connecting the drive pulleys have a tendency to whip particularly if the belt tension is such that the natural frequency of the belts, as stretched strings, corresponds to the operating frequency. This disadvantage is avoided in the apparatus as illustrated in FIG. 11 by including in the drive a differential mechanism in which a dynamic vibration absorber is applied to one portion of the differential mechanism to control the application of force to the work member. In this particular arrangement a work member 105 that is carried on coupling springs 106 and guide springs 107 is driven in vibration from a crankshaft 108 mounted on a base 104 along with the coupling springs 106 and 107. The crankshaft 108 is connected through a connecting rod 109 to a lever 110 the upper end of which is pivotally connected at a pivot 111 to the work member 105. The lower end of the lever 110 carries a mass 112 that functionally corresponds to the crosshead 98 shown in FIG. 9. The mass 112 on the lower end of the lever 110 is connected directly to a dynamic vibration absorber 113 that includes rigidly connected masses 114 and coupling air springs 115. The inflation pressure of the air springs 115 is controlled by a pressure regulator 116.

This arrangement is tuned similarly to the apparatus shown in FIG. 9 with the dynamic absorber 113 supplying force to the lever 110 so that the lever may then transmit force from the connecting rod 109 to the work member 105. In this arrangement, the crankshaft 108 along with the lever 110 constitutes a drive means for applying vibratory force to the work member 105 and the dynamic vibration absorber 113 connected to the lever is thus connected to the drive mechanism to control the magnitude of the force applied to the work member 105.

The relationship between the parts of the apparatus shown in FIG. 11 insofar as the vibration of the various members is concerned is illustrated systematically in FIG. 12. It is clearly apparent from the relationships illustrated in FIG. 12 that the force applied from the connecting rod 109 to the work member 105 depends entirely upon the reaction force applied by the dynamic absorber to the mass 112 on the lever. Thus the lever 110 constitutes a differential means for transmitting force from the connecting rod to the work member and the magnitude of that force is controlled by the attached tunable dynamic absorber.

All of the preceding embodiments of the invention are shown as applied to straight line feeders or conveyors as contrasted with helical conveyors or feeder bowls. The principles of the invention may be applied to helical vibratory apparatus just as well as to the straight line or linear vibratory apparatus. FIGS. 13 and 14 show helical apparatus wherein the application of eccentric weight drives is shown in FIG. 13 and a connecting rod and lever drive is shown in FIG. 14. A system similar to that shown in FIG. 9 could also be readily applied to the helical apparatus.

In the structure shown in FIG. 13, a work member 120 which serves as a base for a helical trough or helical feeder bowl is supported on a plurality of isolating resilient means 121, preferably air springs, so that the base or work member 120 may execute the combination of rotary and vertical translatory vibration such that points on the periphery of the base vibrate back and forth along portions of a helix. The work member 120 is coupled to an exciter member 122 by means of a plurality of springs 123 that extend in an inclined direction between the work member 120 and the exciter member 122. Also a plurality of inclined guide links or cantilever leaf springs 124 are connected between the work member and the exciter member. These coupling springs 123 are illustrative only and may be replaced without change in function by properly oriented rubber block springs or other resilient means.

Vibratory force for this arrangement is supplied by the eccentric weight 125 carried on an armature shaft 126 of a drive motor 127. The eccentric weight is located as near the axis of the exciter member 122 as possible so that it applies useful vibratory force along that axis and an unused component along a diameter of the exciter. The vertical component of this useful force applied through the connecting links or guide springs 124 and coupling springs 123 results in a torsional vibration of the exciter member 122 and the work member 120 as well as a linear vibration of these members toward and away from each other. The combination provides the desired helical motion.

To control the amplitude of vibration of this system a dynamic vibration absorber 130 comprising an absorber mass 131 and air springs 132 is mounted in a frame 133 connected to the exciter member 122. As in the previous examples, the inflation pressure of the air springs is controlled by a regulator 134. In this system, as in those previously described, the dynamic absorber may be tuned through a range either to allow free vibration of the exciter member or to suppress part or all of the vibration of the exciter member. This provides a full range amplitude control for the helical vibratory structure.

In the structure shown in FIG. 14 a work member 140 is carried by springs and links similar to the work member 120 and is driven from a crankshaft 141 and connecting rod 142 that is connected to a lever 143 pivoted on a fulcrum 144 attached to the work member 140. The end of the lever 143 opposite the connecting rod 142 carries a mass 145, corresponding to the mass 112, which is shown in FIG. 11, which is coupled through air springs 146 to a vibratory absorber mass 147. The aborber mass 147 is preferably guided for motion perpendicular to the length of the lever 143 by means of parallel links 148 connected to a standard 149 erected from a base member 150 that also carries the bearings for the crankshaft 141. The inflation pressure of the air springs 146 is controlled by a pressure regulator 151. The tuning for this arrangement is similar to that described for the structure shown in FIG. 11 and provides in the normal range of inflation pressures that the reaction force on the lever 143 may be zero at a certain minimum pressure and equal to the required drive force at another inflation pressure. At the latter pressure the forces transmitted through the work member 140 by the crankshaft 142 and lever 143 are just sufficient to maintain the desired amplitude of vibration with no movement of the lever mass 145. At intermediate inflation pressures the amplitude of vibration varies according to the tuning of the work member 140 on its supporting springs and the actual stiffness of the air springs 146.

In these arrangements for driving helical conveyors, as in the other examples, a tunable dynamic vibration absorber, by controlling the amount of force applied to the vibratary work member, controls the amplitude of vibration of the work member.

In each of the systems illustrated the dynamic vibration absorber serves to control the amplitude of vibration of the work member without producing excessive amplitudes of vibration of any other portion of the equipment. The invention also contemplates and the claims are intended to include the use of a dynamic vibration absorber connected to a work member that is driven by an exciter system such as that shown in FIG. 1 or 4. When applied to such a system the work member must not be tuned to a frequency just above the operating speed because if it is so tuned the motion of the exciter member becomes excessive when the absorber stops the motion of the work member. However, if tuned to other frequencies, such a system may be satisfactorily operated according to the principles of the invention.

Various modifications may be made in specific details of construction of the apparatus without departing from the scope of the invention.

Having described the invention, I claim:

1. In a vibratory work performing system, in combination, a work member to be vibrated, a drive mechanism operating at a generally constant speed, coupling means connecting the drive mechanism to the work member, and a tunable dynamic vibration absorber incorporating an air spring operatively connected to said coupling means and adapted by change of tuning to vary the force transmitted to the work member at said generally constant speed.

2. In a vibratory work performing ssytem, in combination, a work member to be vibrated, a drive mechanism that is operatively connected to the work member and that operates at a generally constant speed and generates a generally constant force and a tunable dynamic vibration absorber operatively connected to the drive mechanism to variably oppose the force of the drive mechanism applied to the work member.

3. In a vibratory system, in combination, a work member to be vibrated, resilient means supporting the work member and forming with the work member a vibratory system having a resonant frequency, drive means including a constant frequency constant force vibration generator arranged to apply vibratory force to the work member, and a variably tuned dynamic vibration absorber operatively connected to said drive means and acting in opposition to the force generator to variably oppose the force applied to the work member.

4. In a vibratory system, in combination, a work member to be vibrated, a drive system that applies vibratory force to the work member, said drive system including at least a shaft driven at a generally constant speed carrying eccentric weights and a variably tuned dynamic vibration absorber that is connected to the part of the drive system journalling the shaft and that is arranged to variably oppose the force of the eccentric weights and thus variably reduce the force applied to the work member.

5. In a vibratory system, in combination, a work member to be vibrated, a drive system that applies vibratory force to the work member, a shaft carrying eccentric weights included in said drive system, means for rotating the weights at a generally constant speed, and a variably tuned dynamic vibration absorber included in the drive system and supplying force in opposition to the vibratory force of the eccentric weights to reduce the force applied to the work member, said absorber including at least one air spring for tuning the absorber.

6. In a vibratory system, in combination, a work member to be vibrated, a drive system that applies vibratory force to the work member, a shaft carrying eccentric weights included in said drive system, means for rotating the weights at a generally constant speed, a variably tuned dynamic vibration absorber included in the drive system, said absorber comprising a mass and at least one air spring connecting the mass to that portion of the drive system journalling the eccentric weights, and means for adjusting the inflation pressure of the air spring.

7. In a vibratory system, in combination, a work member to be vibrated, an exciter member, a shaft carrying eccentric weights journaled in the exciter member, means for rotating the shaft at a generally constant speed, resilient means connecting the exciter member to the work member to form a vibratory system having a fixed resonant frequency, and a variably tuned dynamic vibration absorber connected to said exciter member to variably oppose the force of the eccentric weights whereby the amplitude of the force applied to the vibratory system is varied.

8. In a vibratory system, in combination, a first member, a second member, resilient means connecting said members to form a vibratory system, a shaft carrying eccentric weights journaled in one of said members, means for rotating the weights at a generally constant speed, and a variably tuned dynamic vibration absorber connected to the one of said members journalling the eccentric weights, said absorber being variable through a range of frequencies near said constant speed to control the amplitude of vibration of said members.

9. In a vibratory work performing system, in combination, a work member to be vibrated, a generally constant speed drive mechanism having a first and a second part that move relative to each other through a fixed stroke, one of said parts being fixed to the work member, and a variably tuned dynamic vibration absorber operatively connected to the other of said parts to oppose motion of such part in varying amounts according to the tuning of the absorber relative to the speed of said drive mechanism.

10. In a vibratory work performing system, in combination, a base member, a work member to be vibrated, a generally constant speed drive mechanism having a first and a second part that move relative to each other through a fixed stroke, one of said parts being connected to the work member, a differential mechanism connecting the other part to the other of said members, and a variably tuned dynamic vibration absorber connected to said differential mechanism to control the magnitude of the force transmitted to said work member.

References Cited by the Examiner

UNITED STATES PATENTS

| | | | |
|---|---|---|---|
| 2,819,775 | 1/1958 | Everett | 188—1 |
| 2,958,228 | 11/1960 | Carrier et al. | 74—26 |
| 2,984,339 | 5/1961 | Musschoot | 74—61 X |
| 3,024,663 | 3/1962 | Carrier et al. | 74—61 |
| 3,112,653 | 12/1963 | Morris | 74—61 |

BROUGHTON G. DURHAM, *Primary Examiner.*